United States Patent
Tsubone et al.

(10) Patent No.: US 11,895,262 B2
(45) Date of Patent: Feb. 6, 2024

(54) CALLING SYSTEM AND METHOD FOR PERSONAL WATERCRAFT

(71) Applicant: KAWASAKI MOTORS, LTD., Akashi (JP)

(72) Inventors: Toshiyuki Tsubone, Akashi (JP); Shuichi Miyanishi, Akashi (JP); Tokishin Nishinaka, Akashi (JP); Nobuyuki Nishiguchi, Akashi (JP)

(73) Assignee: KAWASAKI MOTORS, LTD., Akashi (JP)

(*) Notice: Subject to any disclaimer, the term of this patent is extended or adjusted under 35 U.S.C. 154(b) by 0 days.

(21) Appl. No.: 18/166,298

(22) Filed: Feb. 8, 2023

(65) Prior Publication Data

US 2023/0188642 A1 Jun. 15, 2023

Related U.S. Application Data

(62) Division of application No. 17/372,274, filed on Jul. 9, 2021, now Pat. No. 11,611,651.

(51) Int. Cl.
| | |
|---|---|
| *H04M 1/72484* | (2021.01) |
| *G06F 3/0484* | (2022.01) |
| *B63B 45/00* | (2006.01) |
| *H04M 1/72412* | (2021.01) |
| *H04M 1/72454* | (2021.01) |

(52) U.S. Cl.
CPC ......... *H04M 1/72484* (2021.01); *B63B 45/00* (2013.01); *G06F 3/0484* (2013.01); *H04M 1/72412* (2021.01); *H04M 1/72454* (2021.01)

(58) Field of Classification Search
CPC ......... H04M 1/72484; H04M 1/72412; H04M 1/72454; B63B 45/00; B63B 34/10; G06F 3/0484; H04W 4/029
See application file for complete search history.

(56) References Cited

U.S. PATENT DOCUMENTS

| | | | |
|---|---|---|---|
| 9,369,832 B1* | 6/2016 | Noble, III | H04W 4/029 |
| 2004/0048598 A1* | 3/2004 | Gagnon | G08G 1/205 |
| | | | 455/427 |
| 2007/0132608 A1* | 6/2007 | Votaw | G08G 1/161 |
| | | | 340/903 |
| 2013/0141251 A1* | 6/2013 | Sims | G08G 1/205 |
| | | | 340/905 |
| 2017/0122761 A1* | 5/2017 | Lin | G01C 21/362 |
| 2018/0033311 A1* | 2/2018 | Berggren | G01S 19/01 |
| 2020/0193159 A1* | 6/2020 | Sato | G06V 20/64 |

\* cited by examiner

*Primary Examiner* — Farid Seyedvosoghi
(74) *Attorney, Agent, or Firm* — Alleman Hall Creasman & Tuttle LLP (57) ABSTRACT

A calling system for a personal watercraft includes processing circuitry. The processing circuitry is configured to: obtain a specific state signal indicating that the personal watercraft is in a given specific state; and wirelessly transmit a calling signal based on the specific state signal.

19 Claims, 7 Drawing Sheets

CALLING SYSTEM AND METHOD FOR PERSONAL WATERCRAFT

CROSS-REFERENCE TO RELATED APPLICATION

The present application is a divisional of U.S. patent application Ser. No. 17/372,274, filed Jul. 9, 2021, and entitled CALLING SYSTEM AND METHOD FOR PERSONAL WATERCRAFT, the entire disclosure of which is hereby incorporated herein by reference for all purposes.

BACKGROUND

Technical Field

The present disclosure relates to a calling system and method for a personal watercraft.

Description of the Related Art

Personal watercrafts (PWCs) for travel on water are known. The PWCs can travel freely on a vast body of water devoid of any defined routes.

SUMMARY

A calling system for a personal watercraft according to one aspect of the present disclosure includes processing circuitry. The processing circuitry is configured to: obtain a specific state signal indicating that the personal watercraft is in a given specific state; and wirelessly transmit a calling signal based on the specific state signal.

A calling method for a personal watercraft according to one aspect of the present disclosure includes: obtaining a specific state signal by processing circuitry, the specific state signal indicating that the personal watercraft is in a given specific state; and wirelessly transmitting a calling signal based on the specific state signal by the processing circuitry.

DETAILED DESCRIPTION OF THE EMBODIMENTS

Hereinafter, exemplary embodiments will be described with reference to the drawings.

Figure 1:
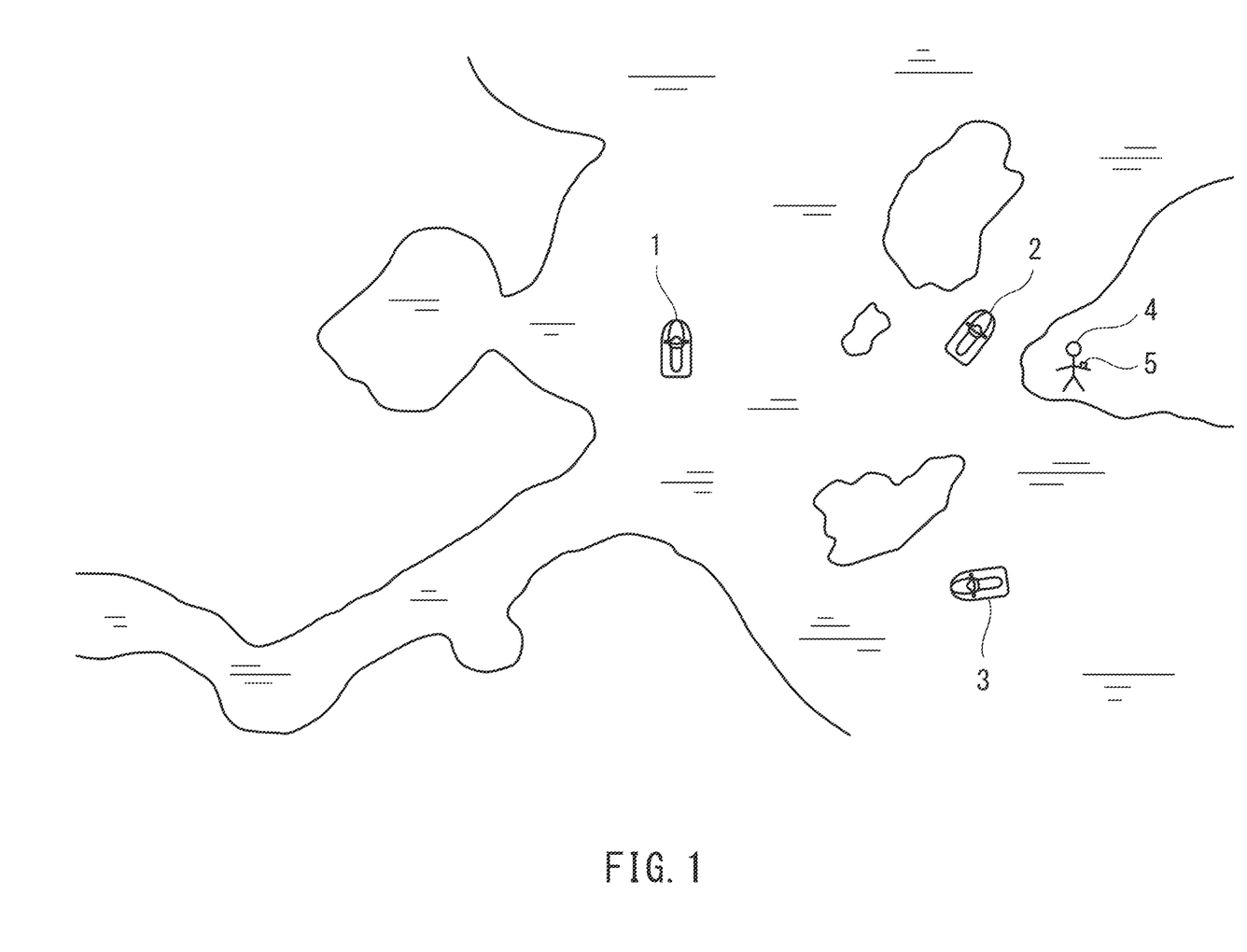
FIG. 1 is a plan view showing personal watercrafts traveling on water and their vicinity as viewed from above.

FIG. 1 is a plan view showing personal watercrafts traveling on water and their vicinity as viewed from above. In the following description, the term "personal watercraft" may be abbreviated as "PWC". As shown in FIG. 1, a situation can arise where on the surface of a body of water W (e.g., a sea or lake) there are PWCs 1 to 3 and a person 4 such as a swimmer who is not on board any PWC. The person 4 may wear a communication terminal 5 such as a smart watch which is wearable and capable of wireless communication. In some cases, there are waterborne obstacles 6 such as a reef, a shore, a revetment fence, a buoy, and a pier on the surface of the body of water W.

PWCs can travel freely over a relatively wide area. Thus, situations can arise where one PWC is traveling in the absence of any other nearby PWCs. For example, there can be a situation where one PWC is traveling in the absence of any other PWCs within the hearing or sight of the operator of the one PWC. In such a situation, the operator of the PWC may want to communicate the state of the operator's own PWC to another PWC operator. A PWC according to an exemplary embodiment includes a calling unit 20 for communicating the state of the PWC to another watercraft. The details of the calling unit 20 will be described later.

Figure 2:
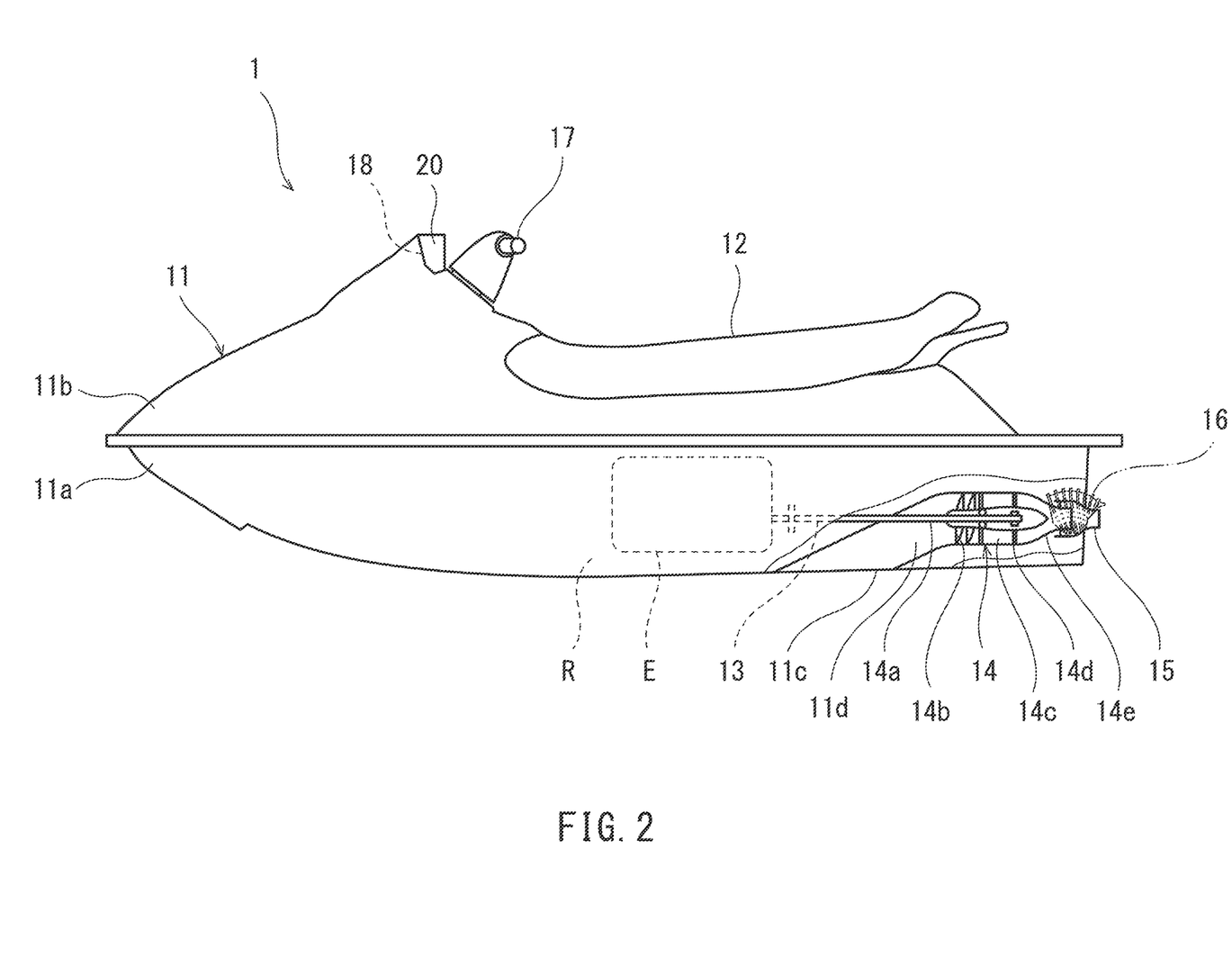
FIG. 2 is a partially cut-away side view of a PWC.

FIG. 2 is a partially cut-away side view of a PWC 1. As shown in FIG. 2, the PWC 1 includes a watercraft body 11 including a hull 11*a* and a deck 11*b* covering the hull 11*a* from above. A seat 12 on which a user sits is mounted on the deck 11*b*. A prime mover room R is located inside the watercraft body 11. The prime mover room R of the watercraft body 11 accommodates a prime mover E. The prime mover E may be an internal combustion engine, an electric motor, or a combination of an internal combustion engine and electric motor. The output shaft of the prime mover E is connected to a propeller shaft 13 extending rearward.

A water jet pump 14 is located in a rear portion of the hull 11*a*. The water jet pump 14 includes: a pump shaft 14*a* coupled to the rear end of the propeller shaft 13; an impeller 14*b* secured to the pump shaft 14*a*; a stator vane 14*c* located behind the impeller 14*b*; a pump casing 14*d* located radially outward of, and enclosing, the impeller 14*b*; and a pump nozzle 14*e* directed behind the watercraft body 11.

A water inlet 11*c* opens at the bottom of the hull 11*a*. The water inlet 11*c* is in communication with the pump casing 14*d* via a water passage 11*d*. To the pump nozzle 14*e* of the water jet pump 14 is connected a steering nozzle 15 which is swingable in the left-right direction. A reverse bucket 16 is mounted on the hull 11*a*. The reverse bucket 16 is pivotally supported by the hull 11*a* and pivotable between an advanced position where the reverse bucket 16 covers the ejection orifice of the steering nozzle 15 from behind to cause water ejected from the steering nozzle 15 to be redirected forward and a retracted position where the reverse bucket 16 allows the ejection orifice of the steering nozzle 15 to be open in the rearward direction.

In the PWC 1, water drawn into the hull 11*a* through the water inlet 11*c* located at the bottom of the hull 11*a* is pressurized and accelerated by rotational power of the impeller 14*b* of the water jet pump 14 driven by the prime mover E. The stream of water is conditioned by the stator vane 14*c* and ejected rearward through the pump nozzle 14*e* and steering nozzle 15 to produce propulsion power. The PWC is not limited to a watercraft which is moved on water by a jet stream of water produced by a water jet pump. The PWC may be a boat which is moved on water by rotation of a propeller.

A bar-shaped handle 17 is located above the front of the deck 11*b* and rotatably supported by the deck 11*b*. Once the operator of the PWC 1 tilts the handle 17 to the left or right, the steering nozzle 15 swings to the left or right in conjunction with the tilting motion of the handle 17.

In this embodiment, the PWC 1 includes a calling unit 20 serving as at least a part of a calling system 100. For example, the calling unit 20 is located ahead of the seat 12. Specifically, the calling unit 20 is removably mounted on a unit support 18 of the PWC 1. For example, the unit support 18 is located ahead of the handle 17, outside the range over which the handle 17 is movable, and above the top surface of the seat 12. Other PWCs such as the PWC 2 have the same configuration and same calling unit 20 as the PWC 1 described above.

Figure 3:
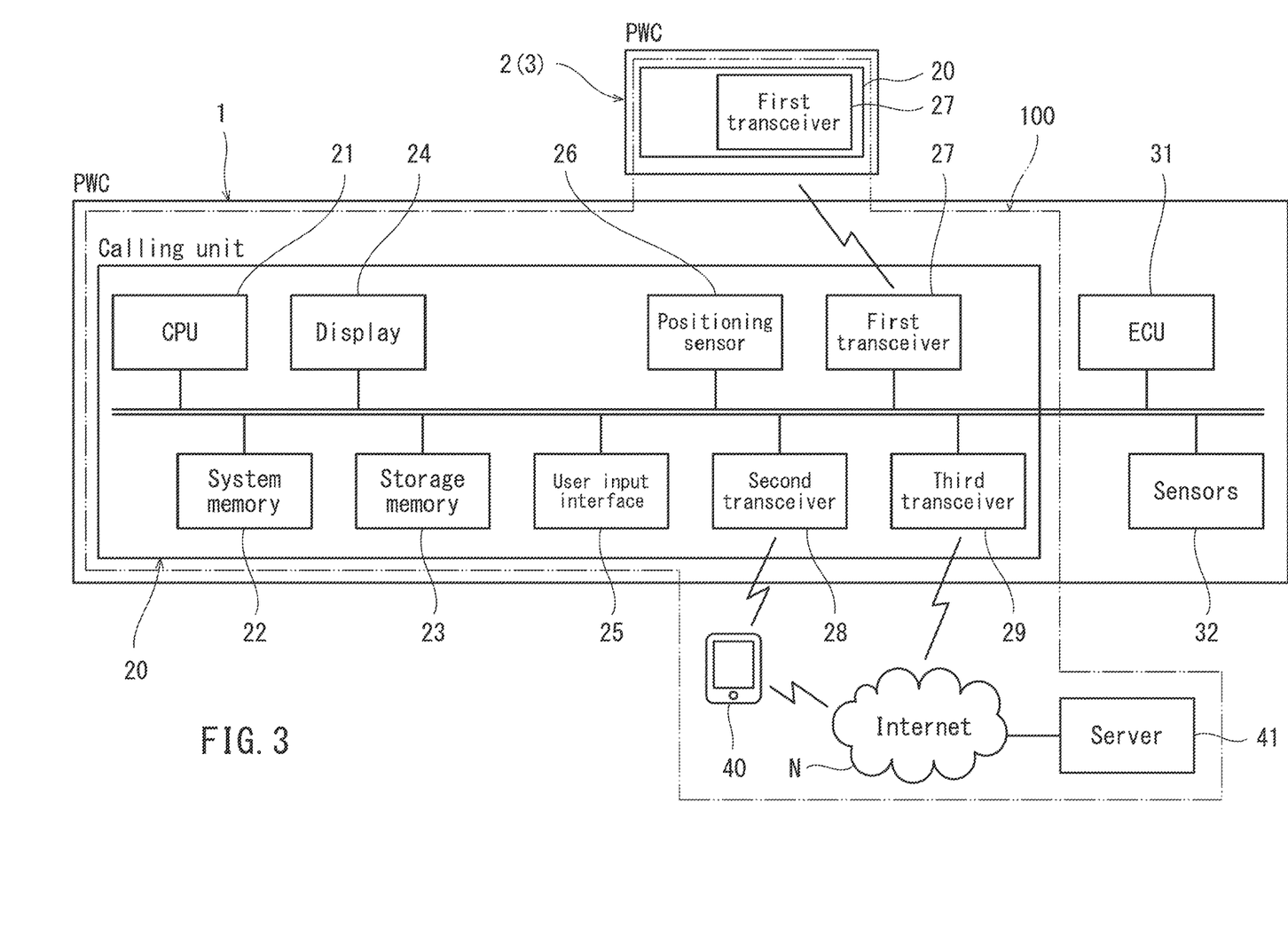
FIG. 3 is a block diagram of a PWC calling system.

FIG. 3 is a block diagram of the PWC calling system 100. As shown in FIG. 3, the PWC calling system 100 includes at least one memory storing a calling program and at least one processor configured to execute the calling program. For example, the PWC calling system 100 includes the calling unit 20. The calling unit 20 includes a memory storing the calling program and a processor configured to execute the calling program. Specifically, the calling unit 20 includes a CPU 21, a system memory 22, a storage memory 23, a display 24, a user input interface 25, a positioning sensor 26, a first transceiver 27, a second transceiver 28, and a third transceiver 29.

The CPU 21 is a central processing unit. The system memory 22 may include a RAM. The storage memory 23 may include a ROM. The ROM prestores identification information of the PWC 1. The storage memory 23 may include a hard disk, a flash memory, or a combination of them. The storage memory 23 prestores the calling program. The configuration in which the CPU 21 executes the calling program retrieved into the system memory 22 is an example of processing circuitry.

The display 24 is a type of user output interface and may be a display device such as a liquid crystal display, an organic EL display, an AR (Augmented Reality) display, a head-mounted display, or an LED. The user input interface 25 is an interface operated by the user to input information. The user input interface 25 may be a touch panel of the display 24, a button, or a lever.

The positioning sensor 26 is a sensor that detects the current location coordinates of the PWC 1. The positioning sensor 26 may be a satellite positioning sensor such as a GPS sensor. The current location coordinates of the PWC 1 may be calculated based on the moving distance calculated from the travel speed and the moving direction calculated from the acceleration.

The first transceiver 27 communicates wirelessly and directly with the first transceivers 27 of other PWCs such as the PWCs 2 and 3, the communication terminal 5 of the swimmer 4, a communication terminal of an administration building 6, or any other like communication device without intervention of any base station. For example, the first transceiver 27 may be configured to perform the wireless communication by RF (Radio Frequency) communication. The frequency range of the wireless communication performed by the first transceiver 27 may be, for example, from 20 kHz to 300 GHz.

The first transceiver 27 may perform communication conforming to standards defined by MURS (Multi-Use Radio Service). The first transceiver 27 may have a power limit of 2 W and transmit and receive electric waves within a selected narrow region of the VHF range. The first transceiver 27 can perform two-way wireless communication by exchanging electric waves with other first transceivers 27 conforming to the same communication standards. For example, the first transceiver 27 may modulate operator voice information collected by an attached microphone, provide the modulated voice information to a carrier wave, and transmit the carrier wave carrying the voice information to the surroundings through an antenna. The first transceiver 27 may demodulate voice information carried by a carrier wave received through the antenna and output the demodulated voice information through an attached speaker. Thus, two PWCs located within the range of VHF electric wave reception can establish two-way voice communication.

The first transceiver 27 may be configured to modulate and demodulate information other than voice in order to establish two-way communication. The first transceiver 27 can provide location information detected by the positioning sensor 26 to a carrier wave and transmit the carrier wave carrying the location information to the other PWCs 2 and 3. In other words, the CPU 21 of the surrounding recognition support unit 20 can obtain location information of the other PWCs 2 and 3 via the first transceiver 27. The first transceiver 27 may provide to a carrier wave the identification information uniquely assigned to the calling unit 20 and transmit the carrier wave carrying the identification information to the other PWCs 2 and 3.

The range of electric wave exchange between the first transceivers 27 is set wider than the range of electric wave exchange between the second transceivers 28 described later. For example, the radius of the range of electric wave exchange between the first transceivers 27 may be set to 1 mile.

The above wireless communication range of the first transceivers 27 is merely an example, and other communication standards and other communication frequencies may be used. That is, it is only required that the transceivers of different watercrafts can perform two-way exchange according to the same communication standards.

The second transceiver 28 communicates wirelessly and directly with a portable information terminal 40 such as a smartphone or smart watch without intervention of any base station. For example, the second transceiver 28 may be configured to wirelessly communicate with the portable information terminal 40 by a near field wireless communication protocol such as Bluetooth or Wi-Fi. For example, the radius of the range of electric wave exchange of the second transceiver 28 is set below 10 m. The presence of the portable information terminal 40 within the range of electric wave exchange can be known through electric wave exchange of the second transceiver 28 with the portable information terminal 40. The portable information terminal 40 includes a processor and a memory. The portable information terminal 40 is mounted on the PWC 1 or carried by the operator of the PWC 1 and moves together with the PWC 1. The portable information terminal 40 is wirelessly connectable to a public network N such as the Internet via a base station located on shore and can communicate with a server 41. The server 41 includes a processor and a memory.

The third transceiver 29 is wirelessly connectable to the public network N such as the Internet via a base station antenna which is a stationary installation, and can communicate with the server 41. Thus, the calling unit 20 may be connected to the network N via the portable information terminal 40. The third transceiver 29 may be configured to exchange electric waves with a satellite. In this case, the third transceiver 29 is connectable to the network N even when the calling unit 20 is outside the range of electric wave exchange of the base station antenna located on shore.

Although in the illustrated configuration the calling unit 20 includes different transceivers, the calling unit 20 may include only one transceiver insofar as the calling unit 20 can transmit signals to other watercrafts. The second and third transceivers 28 and 29 may be omitted, and the communication may be established using the first transceiver 27. The first and third transceivers 27 and 29 may be omitted, and the communication may be established using the second transceiver 28. The first and second transceivers 27 and 28 may be omitted, and the communication may be established using the third transceiver 29.

The PWC 1 includes an ECU (Electronic Control Unit) 31 and sensors 32 in addition to the calling unit 20. The ECU 31 is a prime mover controller that includes a processor and a memory and that controls the prime mover E and other devices based on signals received from the sensors 32. The sensors 32 may include an accelerator sensor that detects the acceleration demand from the operator of the PWC 1, a sensor that detects the rotational speed of the prime mover E, a sensor that detects the level of an energy source such as a fuel or battery, a sensor that detects the travel speed of the PWC 1, a sensor that detects the acceleration of the PWC 1, a sensor that detects the position of the PWC 1, or any combination of these sensors. The sensors 32 may include a sensor that detects abnormalities in the operation of the prime mover or that detects the types of abnormalities (error codes) in the other sensors or the wiring.

The ECU 31 and sensors 32 are connected together by a CAN (Controller Area Network) line, and the calling unit 20 is connected to the CAN line. To removably mount the calling unit 20 on the unit support 18, the PWC 1 may include a communication connection terminal for electrical connection between the calling unit 20 and ECU 31, an electricity supply connection terminal for electricity supply to the calling unit 20, or a combination of these connection terminals. The communication connection terminal and the electricity supply communication terminal may be integral with each other.

The ECU 31 determines whether the PWC 1 is in a specific state based on, for example, detection signals of the sensors 32. Upon determining that the PWC 1 is in the specific state, the ECU 31 transmits a specific state signal to the calling unit 20. There may be different types of specific states in regard to which the ECU makes determination. The specific state is a state meeting a condition under which a calling signal should be transmitted to another watercraft. The specific state may be a state meeting a signal-transmitting condition under which a calling signal should be transmitted to an entity other than the PWC 1 or a state where the calling unit 20 is ready to transmit the calling signal.

For example, the specific state may be a trouble state or an abnormal state. For example, the ECU 31 may determine whether the PWC 1 is in the abnormal state. In this case, the ECU 31 transmits an abnormal state signal to the calling unit 20 upon determining that the PWC 1 is in the abnormal state. The abnormal state may be a failed state where the prime mover E does not operate properly, a state where the PWC 1 has remained capsized for over a given period of time, or a state where the level of the energy source such as a fuel or battery for the prime mover E is below a given value. The specific state may be a state where a warning lamp is lit on an instrument panel of the PWC 1. Specifically, the condition for lighting of the warning lamp may include a condition that engine failure or wiring abnormality has occurred or may include a condition that an abnormality of an electronic component has occurred or an abnormal value has been detected. For example, the electronic component subject to abnormality detection may include an exhaust gas sensor, an air-intake sensor, an engine oil-pressure sensor, an engine coolant sensor, an ignition sensor, a throttle sensor, a battery voltage sensor, or a rotational speed sensor. The specific state may be a so-called "limp home" state where control for limiting the output of the prime mover E has been carried out to address the abnormal state described above.

The specific state may be a state other than the abnormal state. For example, the specific state may be a state where the operator has issued an instruction to transmit a calling signal to another watercraft by operating the user input interface 25. For example, the PWC 1 may include a calling switch operable by the operator to input an instruction to transmit a calling signal. In this case, the ECU 31 may determine that the specific state has occurred in response to an operation of the calling switch by the operator. For example, the specific state may include a state where the operator can move by the operator's own watercraft but wants to be picked up by another watercraft. Additionally or alternatively, the ECU 31 may determine that the specific state has occurred in case that a tether cord of the PWC is pulled out by the operator or in case that the operator is detected as being away from the seat 12 by means such as wireless communication or a pressure sensor.

The determination of whether the PWC 1 is in the specific state may be performed by the CPU 21 of the calling unit 20 rather than by the ECU 31. In this case, upon determining that the PWC 1 is in the specific state, the CPU 21 of the calling unit 20 generates a specific state signal, and thus the calling unit 20 obtains the specific state signal within itself. The sensor used for determination of whether the PWC 1 is in the specific state may be a sensor of the calling unit 20 rather than any of the sensors 32 of the PWC 1. The CPU 21 may determine whether the specific state has occurred based on pieces of information provided from the various sensors 32 through CAN communication. In the configuration where the CPU 21 determines whether the specific state has occurred independently of the ECU 31, whether the specific state has occurred can be determined based on conditions different from those based on which the ECU 31 makes determination as to abnormalities.

The calling unit 20 may be configured to, upon wirelessly transmitting a calling signal, inform the operator of the wireless calling signal transmission using a user output interface such as the display 24. The calling unit 20 can allow the calling signal to contain information obtained by the positioning sensor 26, information obtained by the ECU 31 and indicating the type of the specific state, or a combination of these pieces of information. The calling unit 20 can allow the calling signal to contain information such as voice or text information input to the user input interface 25.

The calling unit 20 is configured to receive a calling signal from another watercraft through the first transceiver 27. The calling unit 20 is configured to, upon receiving a calling signal from another watercraft, inform the operator of the calling signal reception using a user output interface such as the display 24.

Other PWCs such as the PWC 2 include the same calling unit 20 as the PWC 1. In FIG. 3, for simplicity of illustration, only the first transceiver 27 is shown as a component of the calling unit 20 of the PWC 2, and the other components of the calling unit 20 of the PWC 2 are omitted.

Figure 4:
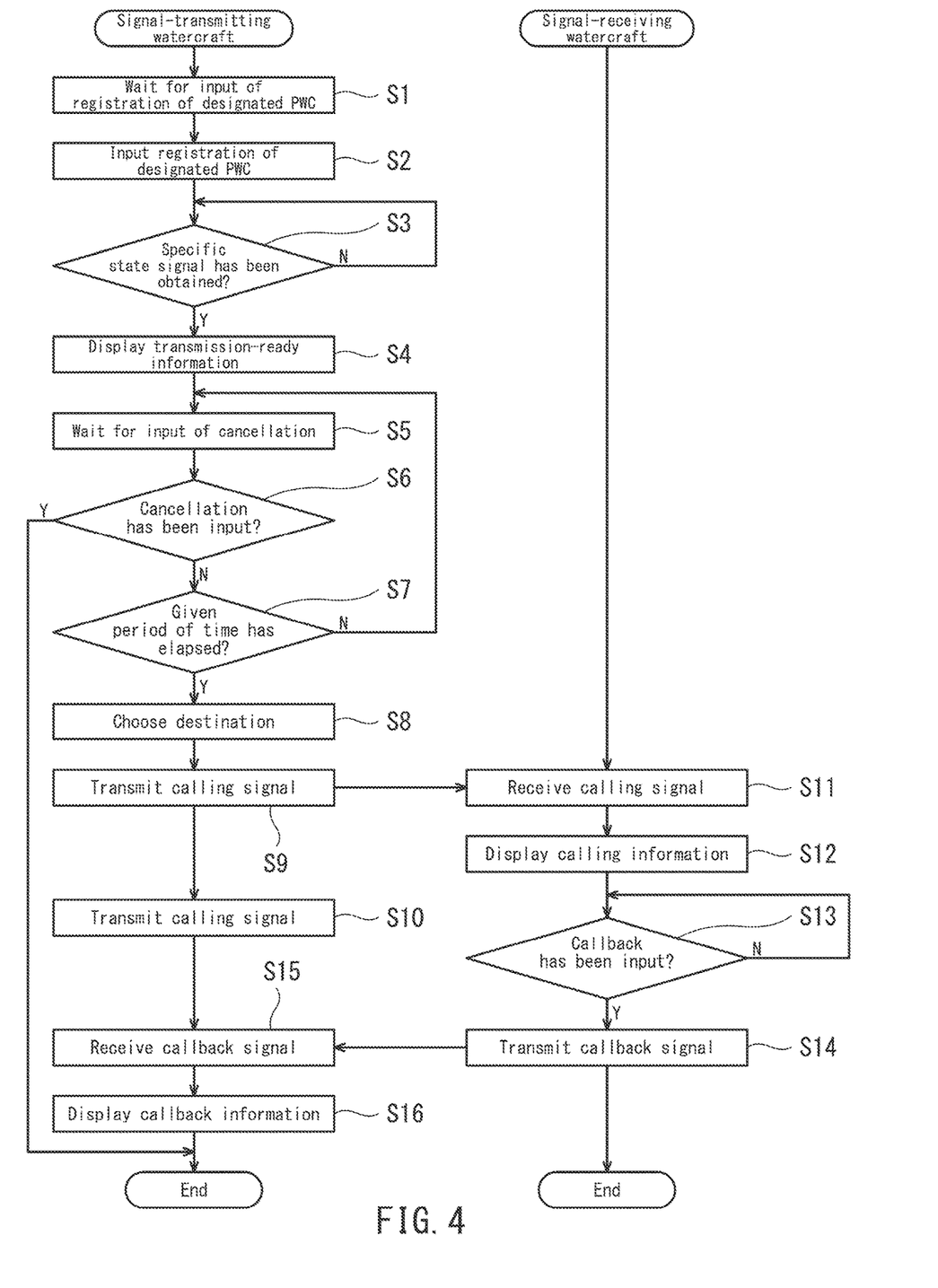
FIG. 4 is a flowchart illustrating a process of the PWC calling system of FIG. 3.

FIG. 4 is a flowchart illustrating a process of the PWC calling system 100 of FIG. 3. In the PWC calling system 100, the process described hereinafter is mainly carried out by the CPU 21 executing various commands of the calling program in the calling unit 20. The process will be described in line with FIG. 4 with reference to FIG. 3 and other figures. In the context of FIG. 4, the first PWC 1 that transmits a calling signal is referred to also as "signal-transmitting watercraft", and the second PWC 2 that receives the calling signal is referred to also as "signal-receiving watercraft". The calling unit 20 of the signal-transmitting watercraft (PWC 1) is referred to also as "first calling unit", and the calling unit 20 of the signal-receiving watercraft (PWC 2) is referred to also as "second calling unit". The first transceiver 27 of the calling unit 20 of the signal-transmitting watercraft 1 serves as a first wireless communicator of the signal-transmitting watercraft 1, and the first transceiver 27 of the calling unit 20 of the signal-receiving watercraft 2 serves as a second wireless communicator of the signal-receiving watercraft 2.

As shown in FIG. 4, the CPU 21 of the calling unit 20 of the signal-transmitting watercraft 1 (first PWC 1) causes the display 24 to display a user input screen in response to a given input operation and waits for a user input that commands the CPU 21 to register one or more other PWCs as designated PWCs which are candidates for signal-receiving watercrafts (step S1). The CPU 21 may wait for a user input that commands the CPU 21 to register a group consisting of the one or more designated PWCs. The CPU 21 may wait for a user input that commands the CPU 21 to register one of the designated PWCs of the group as a group leader.

The user operates the user input interface 25 of the calling unit 20 to input registration of the designated PWCs (step S2). The user may input registration of the group and/or the group leader. The CPU 21 stores information about the registered designated PWCs into the storage memory 23. Steps S1 and S2 can be carried out at appropriate times according to the user's demand. Steps S1 and S2 may be skipped.

The registration of the designated PWC may be accomplished by two-way exchange between the first transceivers 27. The CPU 21 can receive identification information of other PWCs and other pieces of information such as the location, moving direction, and moving speed of the other PWCs through the first transceiver 27. For example, in step S1, the CPU 21 may cause the display 24 to display the location information of the other PWCs as obtained through the first transceiver 27. The user of the signal-transmitting watercraft 1 determines whether to register the other PWCs based on the location and identification information of the other PWCs which are displayed on the display 24. Based on the information displayed on the display 24, the operator of the signal-transmitting watercraft 1 selects a PWC to be registered and instructs the CPU 21 to register the selected PWC through the user input interface 25. The CPU 21 stores the identification information of the PWC 2 selected by the user into the storage memory 23. The stored identification information of the PWC 2 is handled as identification information of the PWC to be designated.

In steps S1 and S2, the calling unit 20 may wait for a user input in a manner permitting the designated PWCs to be registered into different groups, and may cause the storage memory 23 to store the designated PWCs in association with the corresponding groups. The calling unit 20 may wait for a user input in a manner permitting the designated PWCs to be registered into different levels, and may cause the storage memory 23 to store the designated PWCs in association with the corresponding levels. When causing the display 24 to display the user input screen, the CPU 21 may wait for a user input that commands the CPU 21 to register a communication device such as that of a waterborne vehicle other than PWCs, a given user, or a given administrator as a designated communication partner, and may cause the storage memory 23 to store the designated communication partner.

Figure 5:
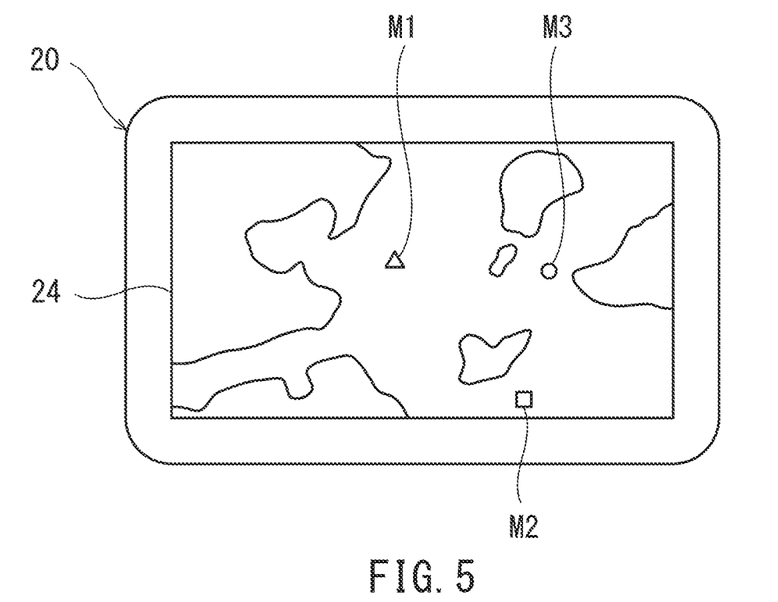
FIG. 5 shows a normal display screen of a calling unit of a signal-transmitting watercraft.

FIG. 5 shows a normal display screen of the calling unit 20 of the signal-transmitting watercraft 1. As shown in FIG. 5, when the signal-transmitting watercraft 1 is traveling in a normal state, the display 24 of the calling unit 20 displays a mark M1 indicating the location of the PWC 1 and marks M2 and M3 indicating the locations of the other PWCs 2 and 3 on a map.

As previously described, the CPU 21 of the first calling unit 20 determines whether the specific state signal indicating that the signal-transmitting watercraft 1 is in the specific state has been obtained (step S3). Upon determining that the specific state signal has been obtained (step S3: Y), the CPU 21 causes the display 24 of the signal-transmitting watercraft 1 to display transmission-ready information (step S4).

Figure 6:
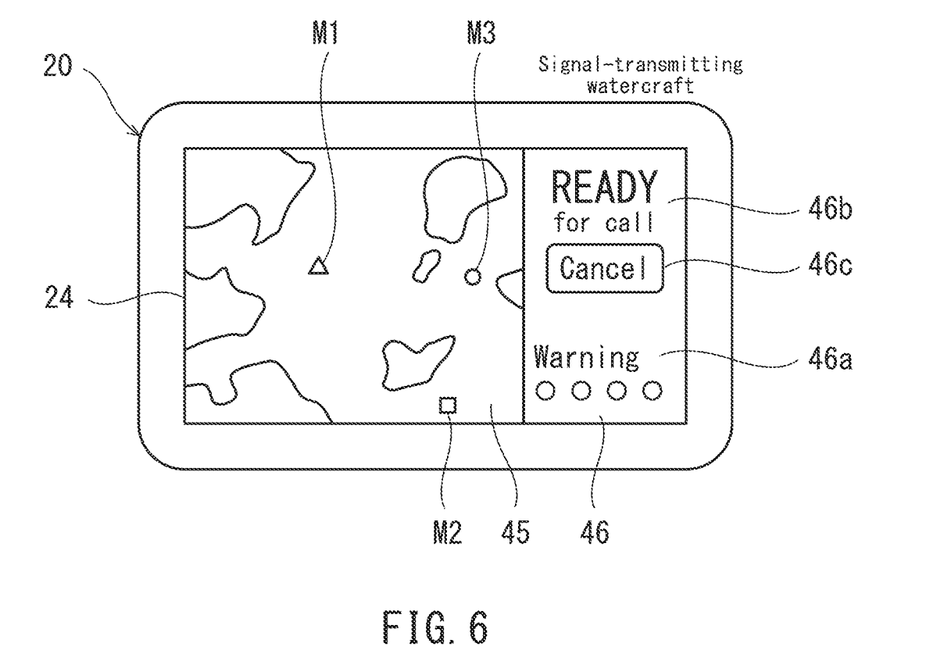
FIG. 6 shows a specific state occurrence display screen of the calling unit of the signal-transmitting watercraft.

FIG. 6 shows a specific state occurrence display screen of the calling unit 20 of the signal-transmitting watercraft 1. As shown in FIG. 6, the specific state occurrence screen of the display 24 of the calling unit 20 of the signal-transmitting watercraft 1 includes, for example, a map screen 45 and a reference screen 46. The map screen 45 is similar to the screen of FIG. 5. The reference screen 46 displays specific state information 46*a* indicating the content of the specific state which has occurred, such as the content of the abnormal state. The reference screen 46 displays transmission-ready information 46*b*. The transmission-ready information 46*b* is information indicating establishment of a transmission-ready state where the calling unit 20 is ready to transmit the calling signal described later. The reference screen 46 further displays a cancellation input icon 46*c*. By displaying the cancellation input icon 46*c*, the CPU 21 waits for a cancellation input provided from the user to cancel the transmission of the calling signal described later (step S5).

The CPU 21 determines whether the user input interface 25 has received the cancellation input from the user within a given period of time (step S6). Upon determining that the user has selected the cancellation input icon 46*c* (step S6: Y), the CPU 21 cancels the transmission of the calling signal and ends the process. Upon determining that the cancellation input has not been received (step S6: N), the CPU 21 determines whether a given period of time has elapsed after the specific state signal was obtained or the transmission-ready state began to be displayed (step S7). Upon determining that the given period of time has not elapsed (step S7: N), the CPU 21 returns to step S5. The calling unit 20 may transmit the calling signal in response to a user command before the lapse of the given period of time.

Upon determining that the given period of time has elapsed (step S7: Y), the CPU 21 of the first calling unit 20 chooses the destination of the calling signal to wirelessly transmit the calling signal (step S8). The CPU 21 may specify broadcast addresses as the destination to broadcast the calling signal. The CPU 21 may specify, as the destination, the one or more designated PWCs registered as candidates for signal-receiving watercrafts in step S2, and need not specify any other entity as the destination. In the case where different groups each consisting of one or more designated PWCs are registered, the designated PWC(s) belonging to a particular one of the groups may be specified as the destination.

The CPU 21 may choose the destination of the calling signal according to the content of the specific state indicated by the specific state signal. For example, the destination of a first type of calling signal to be transmitted when the content of the specific state falls into a first category and the destination of a second type of calling signal to be transmitted when the content of the specific states fall into a second category may be entirely or partially different from each other. The correspondence relationship between the content of the specific state and the category may be predetermined by the calling program. The specific state signal may contain category information. The categories may be levels or ranks.

The number of the destinations of the calling signal based on the specific state of the first category may be greater than the number of the destinations of the calling signal based on the specific state of the second category. For example, the destinations of the calling signal based on the specific state of the first category may be set to broadcast addresses, and the destinations of the calling signal based on the specific state of the second category may be set only to the designated PWCs. The content of the specific state falling into the first category may be a content indicating that the PWC 1 is incapable of traveling. For example, the content of the specific state falling into the first category may be that the prime mover E cannot be operated due to failure or lack of fuel. The content of the specific state falling into the first category may be that a collision has been detected by a collision detection sensor. The content of the specific state falling into the first category may be that the PWC 1 has been detected as remaining capsized for over a given period of time by a position detection sensor. The content of the specific state falling into the second category may be that failure of an accessory such as a communication device has been detected although the PWC 1 is capable of traveling. As in this case, the specific state falling into the second category may be set to a warning state less severe than the specific state falling into the first category. The specific state falling into the second category need not be any abnormal state, and may be a state where the operator has performed an input operation for issuing a call to another watercraft.

The destination of the calling signal may be chosen according to a predetermined condition. The predetermined condition may include an environmental condition. The environmental condition may include a condition related to the ambient temperature, the weather, or a combination of them. For example, when the ambient temperature is lower than a threshold, more destinations of the calling signal may be set than when the ambient temperature is equal to or higher than the threshold. When the ambient temperature is lower than the threshold, all of the designated PWCs belonging to a particular group may be specified as the destinations of the calling signal, while when the ambient temperature is equal to or higher than the threshold, only the designated PWC registered as the leader of the group may be specified as the destination of the calling signal. For example, in a first type of weather such as in rainy weather, foggy weather, or the dusk during which the visibility is poor, more destinations of the calling signal may be set than in a second type of weather such as in fine weather during which the visibility is good. In the first type of weather, all of the designated PWCs belonging to a particular group may be specified as the destinations of the calling signal, while in the second type of weather, only the designated PWC registered as the leader of the group may be specified as the destination of the calling signal. The environmental condition may be other than those related to the temperature or visibility. For example, wind strength, tidal current, or water temperature may be involved in the environmental condition.

The predetermined condition for choosing the destination of the calling signal may include a time zone condition. In a first type of time zone such as early morning or early evening during which travel-influencing factors such as temperature and visibility are unfavorable, more destinations of the calling signal may be set than in a second type of time zone such as daytime during which the travel-influencing factors are favorable. In the first type of time zone, all of the designated PWCs belonging to a particular group may be specified as the destinations of the calling signal, while in the second type of time zone, only the designated PWC registered as the leader of the group may be specified as the destination of the calling signal.

The CPU 21 of the first calling unit 20 wirelessly transmits the calling signal to the chosen destination as a function of the specific state signal (step S9). The calling signal may contain location information indicating the location of the signal-transmitting watercraft (PWC 1). The calling signal may contain identification information of the signal-transmitting watercraft (PWC 1). The calling signal may contain different pieces of information according to the content of the specific state indicated by the specific state signal obtained by the CPU 21. The calling signal may contain content information indicating the content of the specific state indicated by the specific state signal.

The calling signal may contain information indicating the location of the signal-transmitting watercraft 1 as detected by the positioning sensor 26. The calling signal may contain identification information of the signal-transmitting watercraft 1. The calling signal may contain information indicating the type of the specific state. For example, the calling signal may contain information that makes it possible to distinguish whether the calling signal originates with an operation by the operator or with the abnormal state of the signal-transmitting watercraft 1. The calling signal originating with the abnormal state of the signal-transmitting watercraft 1 may contain an error code.

In the first calling unit 20, once the calling signal is wirelessly transmitted, the CPU 21 causes the display 24 of the calling unit 20 of the signal-transmitting watercraft (PWC 1) to display information indicating completion of the wireless transmission of the calling signal (step S10). The operator of the signal-transmitting watercraft (PWC 1) can know the completion of calling signal transmission from the displayed information.

The calling signal wirelessly transmitted from the first transceiver 27 of the calling unit 20 of the signal-transmitting watercraft (PWC 1) is received by the first transceiver 27 of the calling unit 20 of the signal-receiving watercraft (PWC 2) (step S11). In the example described here, the signal-receiving watercraft (PWC 2), which is a waterborne vehicle, is included in the destinations of the calling signal and receives the calling signal. The present disclosure is not limited to this example, and an entity other than waterborne vehicles may receive the calling signal. For example, a communication device such as the communication terminal 5 of the swimmer 4 may receive the calling signal. Additionally or alternatively, a communication terminal of an operator of a waterborne vehicle other than the signal-transmitting watercraft may receive the calling signal. The signal-receiving entity is not limited to those located on water, and a communication device of a facility on shore or a terminal device of a person on shore may receive the calling signal.

In the signal-receiving watercraft 2, the CPU 21 of the calling unit 20 having received the calling signal causes the display 24 to display calling information based on the information contained in the received calling signal (step S12). The calling information displayed on the display 24 of the signal-receiving watercraft 2 includes reference information that helps to head for the signal-transmitting watercraft 1. The operator of the signal-receiving watercraft 2 can perceive the calling information by viewing the display 24 of the signal-receiving watercraft 2. The output of the calling information is not limited to visual output such as the displaying on the display 24, and may be auditory or tactile output. The user interface that outputs the calling information may be a speaker or vibrator.

Figure 7:
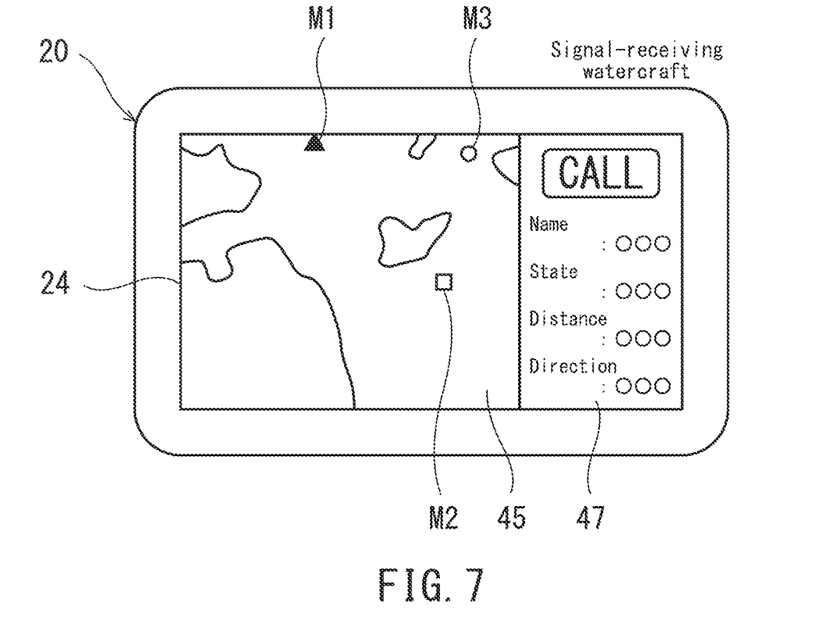
FIG. 7 shows an example of a call reception display screen of a calling unit of a signal-receiving watercraft.

FIG. 7 shows an example of a call reception screen of the display 24 in the signal-receiving watercraft 2. As shown in FIG. 7, the display 24 of the calling unit 20 of the signal-receiving watercraft 2 having received the calling signal displays a map screen 45 and a reference screen 47. The map screen 45 displays a mark M2 indicating the location of the PWC 2, a mark M1 indicating the location of the signal-transmitting watercraft 1, and a mark M3 indicating the location of another PWC 3 on a map. The mark M1 representing the signal-transmitting watercraft 1 which is the source of the calling signal may be referred to as "signal-transmitting watercraft mark".

The calling unit 20 of the signal-receiving watercraft 2 displays the signal-transmitting watercraft mark M1 in a manner different from a normal manner of display. In the manner of display different from the normal manner of display, the signal-transmitting watercraft mark M1 may be highlighted. The signal-transmitting watercraft mark M1 representing the source of the calling signal may be displayed in a manner including blinking, color change, enlargement, and/or brightness change. The change in the manner of displaying the signal-transmitting watercraft mark M1 is an example of the calling information. The location of the signal-transmitting watercraft mark M1 displayed on the map screen 45 is an example of the reference information that helps to head for the PWC 1.

The reference screen 46 displays the reference information related to the signal-transmitting watercraft 1 and contained in the calling signal. The reference information includes the name of the user of the signal-transmitting watercraft 1, the content of the specific state of the signal-transmitting watercraft 1, the distance from the signal-receiving watercraft 2 to the signal-transmitting watercraft 1, the direction of the signal-transmitting watercraft 1 with respect to the signal-receiving watercraft 2, or any combination of these pieces of information. The distance and direction are examples of the reference information that helps to head for the signal-transmitting watercraft 1.

Since the location of the signal-transmitting watercraft 1, the direction of the signal-transmitting watercraft 1, the distance to the signal-transmitting watercraft 1, or any combination of these pieces of information is displayed on the calling unit 20 of the signal-receiving watercraft 2, the operator of the signal-receiving watercraft 2 can easily reach the signal-transmitting watercraft 1. Since the abnormal state or comments concerning the signal-transmitting watercraft 1 are displayed on the calling unit 20 of the signal-receiving watercraft 2, the operator of the signal-receiving watercraft 2 can easily take necessary actions. The calling unit 20 of the signal-receiving watercraft 2 may automatically send to the calling unit 20 of the signal-transmitting watercraft 1 a reception confirmation signal indicating that the calling signal has been received. Upon receiving the reception confirmation signal, the calling unit 20 of the signal-transmitting watercraft 1 may cause the display 24 to display reception confirmation information indicating that the calling unit 20 of the signal-receiving watercraft 2 has received the calling signal. The reception confirmation signal may contain identification information of the signal-receiving watercraft 2. The calling unit 20 of the signal-transmitting watercraft 1 having received the reception confirmation signal may display the source of the reception confirmation signal in a manner permitting identification of the source.

Figure 8:
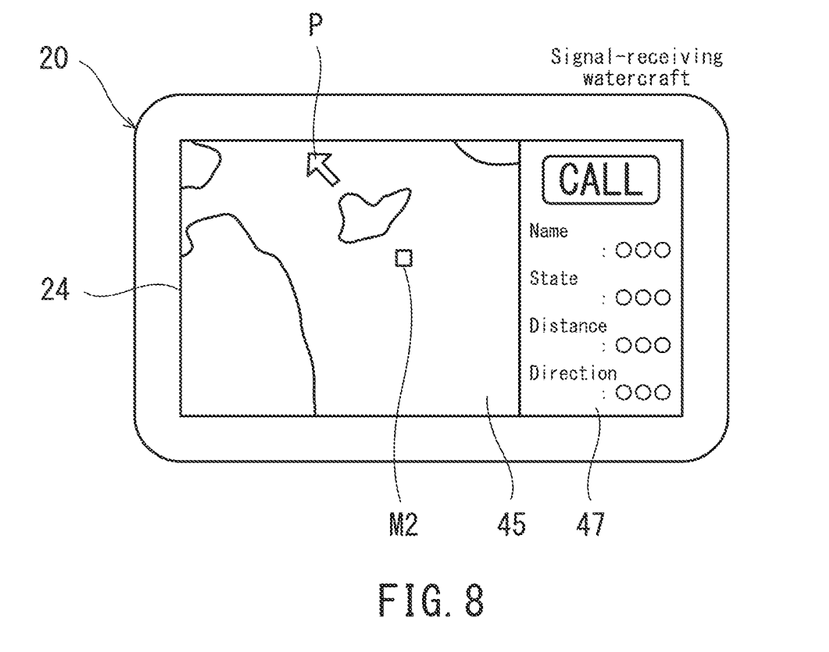
FIG. 8 shows another example of the call reception display screen of the calling unit of the signal-receiving watercraft.

FIG. 8 shows another example of the call reception screen of the display 24 in the signal-receiving watercraft 2. In the example of FIG. 8, the signal-transmitting watercraft 1, which is the source of the calling signal, is outside the display range of the map screen 45. In this case, the map screen 45 may display an arrow P indicating the direction of the signal-transmitting watercraft 1 with respect to the signal-receiving watercraft 2. The arrow P may be displayed in a highlighted manner; for example, the arrow P may blink or be displayed with high brightness. The arrow P is an example of the calling information and also an example of the reference information that helps to head for the PWC 1.

The operator of the signal-receiving watercraft 2 can inform the signal-transmitting watercraft 1 which is the source of the calling signal that the operator has perceived the calling information output by the display 24 of the calling unit 20 of the signal-receiving watercraft 2. Specifically, the operator of the signal-receiving watercraft 2 can input a callback command by operating the user input interface 25 of the calling unit 20 of the signal-receiving watercraft 2 (step S13). Upon determining that the callback command has been input (step S13: Y), the calling unit 20 of the signal-receiving watercraft 2 wirelessly transmits a callback signal from the first transceiver 27 to the destination, i.e., the calling unit 20 of the signal-transmitting watercraft 1 (step S14). Along with this transmission, the calling unit 20 of the signal-receiving watercraft 2 may transmit another piece of information from the second or third transceiver 28 or 29 to the server 41, the other piece of information indicating that the callback signal has been wirelessly transmitted.

The calling unit 20 of the signal-transmitting watercraft 1 receives the callback signal wirelessly transmitted from the calling unit 20 of the signal-receiving watercraft 2 (step S15). Upon receiving the callback signal, the calling unit 20 of the signal-transmitting watercraft 1 causes the display 24 to display callback information (step S16). By viewing the callback information displayed on the display 24 of the signal-transmitting watercraft 1, the operator of the signal-transmitting watercraft 1 can know that another user has perceived the calling information and provided a response.

The output of the callback information is not limited to visual output such as displaying on the display 24, and may be auditory or tactile output. The callback information includes information indicating that the other user has perceived the calling information and provided a response. The output of the callback information may be displaying of a mark representing the callback. The output of the callback information may include displaying of information indicating the source of the callback signal.

After transmitting the calling signal (step S9), the calling unit 20 of the signal-transmitting watercraft 1 may repeat the wireless transmission of the calling signal periodically until receiving the callback signal. The transmission-to-transmission interval in the periodic calling signal transmission may be constant or variable. Upon receiving the callback signal, the calling unit 20 of the signal-transmitting watercraft 1 may end the periodic wireless transmission of the calling signal.

In the foregoing description, the signal-transmitting watercraft that transmits the calling signal and receives the callback signal is the first PWC 1, while the signal-receiving watercraft that receives the calling signal and transmits the callback signal is the second PWC 2. The same process can be accomplished also in the case where the relationship between the first and second PWCs 1 and 2 is reversed. That is, the signal-transmitting watercraft 1 has the function of acting as a signal-receiving watercraft, and the signal-receiving watercraft 2 has the function of acting as a signal-transmitting watercraft. Specifically, in the case where the calling unit 20 of the PWC 2 acting as a signal-transmitting watercraft transmits the calling signal and the calling unit 20 of the PWC 1 acting as a signal-receiving watercraft receives the calling signal, the display 24 of the signal-receiving watercraft (PWC 1) displays the calling information as a function of the calling signal. In the case where the calling unit 20 of the signal-receiving watercraft (PWC 1) transmits the callback signal and the calling unit 20 of the signal-transmitting watercraft (PWC 2) receives the callback signal, the display 24 of the signal-transmitting watercraft (PWC 2) displays the callback information as a function of the callback signal.

Figure 9:
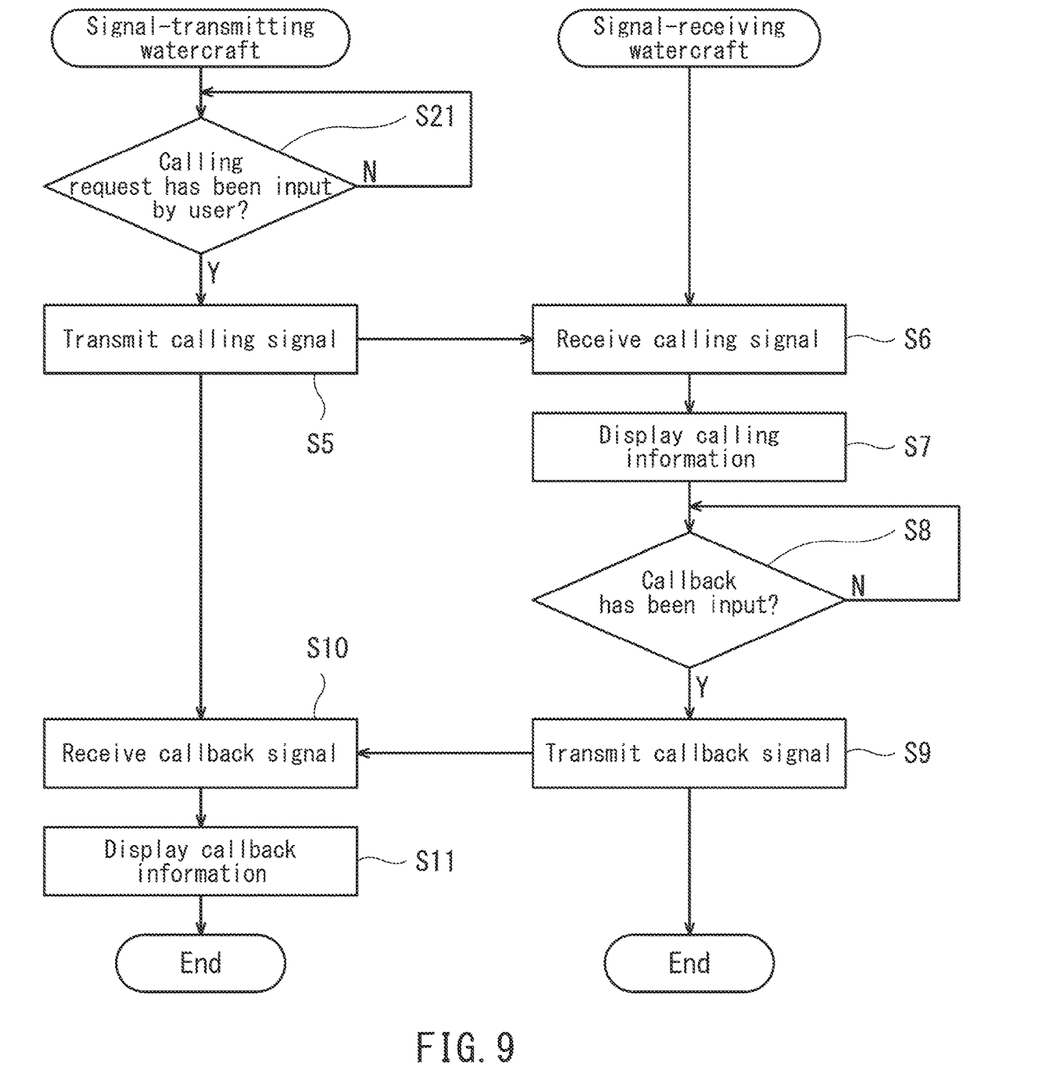
FIG. 9 is a flowchart illustrating another process of the PWC calling system of FIG. 3.

FIG. 9 is a flowchart illustrating another process of the PWC calling system 100 of FIG. 3. In the process of FIG. 9, an operation as a trigger for calling signal generation is manually performed. In FIG. 9, the steps which are the same as those shown in FIG. 4 are denoted by the same reference signs. As shown in FIG. 9, the calling unit 20 of the signal-transmitting watercraft (PWC 1) waits for a calling request input by the user. The calling unit 20 of the signal-transmitting watercraft 1 determines whether the calling request has been input through the user input interface 25 (step S21). Upon determining that the calling request has been input by the operator of the signal-transmitting watercraft 1 (step S21: Y), the calling unit 20 of the signal-transmitting watercraft 1 generates and wirelessly transmits the calling signal (step S5). The subsequent procedures are the same as those in the example described with reference to FIG. 4, and will therefore not be described again.

The flowcharts shown in FIGS. 4 and 9 are merely examples. The order of the steps may be changed, and some of the steps may be skipped. In FIG. 4, the displaying of the transmission-ready information (step S4) and the cancellation input (steps S5 and S6) may be skipped. Upon obtaining the specific state signal, the calling unit 20 of the signal-transmitting watercraft 1 may proceed to the transmission process without waiting for the operator to provide an instruction to transmit the calling signal. The destination of the calling signal need not be changed according to the content of the specific state signal and may remain the same regardless of the content of the specific state. The transmission and reception of the callback signal may be skipped. The condition for calling signal transmission may or may not include reception of the instruction from the user.

The destination of the calling signal may be set according to who is the operator of the signal-transmitting watercraft 1. For example, in the case where the operator of the signal-transmitting watercraft 1 is an operator for whom the output power of the PWC is to be limited (an example of such an operator is a beginner), the choice of destinations of calling signal transmission may be wider than in the case where the operator of the signal-transmitting watercraft 1 is not subject to such a limitation. Whether there is an output power limitation imposed according to the type of the operator may be determined by identifying the type of the key with which the PWC is equipped. Additionally or alternatively, destinations appropriate for the operator may be set by inputting the years of experience or the age of the operator to the user input interface 25.

A part or all of the calling program may be executed by the portable information terminal 40 carried by the operator instead of being executed by the calling unit 20. In this case, the functions of the display and CPU can be achieved by the display and CPU of the portable information terminal 40. For example, in the case where the program is executed by the CPU of the portable information terminal 40, the PWC is equipped with a transceiver for communication with other watercrafts, and the use of this transceiver enables two-way communication with the other watercrafts beyond the range of electric wave reception of a base station located on shore.

In the case where the portable information terminal 40 or third transceiver 29 can communicate with the server 41 via an onshore base station, a part or all of the calling program may be executed by the server 41 rather than by the calling unit 20 or portable information terminal 40. In the case where the server 41 executes the program for calling signal transmission, the server 41 can transmit the calling signal to a wide variety of receiving devices via a public network or the Internet. A part or all of the calling program may be executed by an ECU mounted on a PWC in which the calling unit 20 is installed. For example, allowing the ECU 31 of the PWC 1 to serve the function of the CPU 21 of the calling unit 20 eliminates the need for a CPU dedicated for the calling process and leads to easy reduction of the number of required components.

Although in the example described above the signal-receiving watercraft 2 receives the calling signal, a portable terminal carried by a swimmer or another PWC operator may have the same function as the calling unit 20 of the signal-receiving watercraft 2. In this case, the swimmer or the other PWC operator can know that the calling signal has been transmitted, and the number of candidate recipients can be increased. The server 41 may receive the calling signal from the signal-transmitting watercraft 1 via a base station and transmit the calling signal to a wide variety of recipients. The intervention of the server 41 makes it possible to transmit the calling signal to many receiving devices connected to the server 41 and let various people perceive the calling signal. The calling unit 20 may be installed in an onshore facility. This allows a person in the onshore facility to perceive the calling signal.

In the configuration described above, the calling unit 20 wirelessly transmits the calling signal when the signal-transmitting watercraft 1 is in the predetermined specific state. Thus, the occurrence of the specific state of the signal-transmitting watercraft 1 can be communicated to a recipient distant from the signal-transmitting watercraft 1. This makes it possible for the operator of the signal-receiving watercraft 2 to know the occurrence of the specific state of the signal-transmitting watercraft 1 even when the watercrafts are on a vast body of water devoid of any defined routes. In particular, even in case that the signal-transmitting watercraft 1 is out of the sight of the operator of the signal-receiving watercraft 2 because of waterborne obstacles, waves, or fog, the operator of the signal-receiving watercraft 2 can easily know the occurrence of the specific state of the signal-transmitting watercraft 1.

The calling signal can contain the location information indicating the location of the signal-transmitting watercraft 1. Thus, the operator of the signal-receiving watercraft 2 can know the location of the signal-transmitting watercraft 1 and move the signal-receiving watercraft 2 easily toward the PWC 1 which is in the specific state. This can reduce the time taken for the signal-receiving watercraft 2 to reach the signal-transmitting watercraft 1. The location information of the signal-transmitting watercraft 1 may be displayed on a map, or the direction and distance may be displayed as the location information. In the calling unit 20 of the signal-receiving watercraft 2, only the direction toward the signal-transmitting watercraft 1 may be displayed as the location information of the signal-transmitting watercraft 1.

The calling signal can contain the identification information of the signal-transmitting watercraft 1, and the identification information can be output in a manner permitting the operator of the signal-receiving watercraft 2 to perceive the identification information. Thus, the recipient can easily identify the signal-transmitting watercraft 1 which is in the specific state. The outputting the identification information includes outputting unique information related to the identification information (examples of the unique information include the owner name, type, manufacturer name, and color of the watercraft).

The calling signal can contain the content information indicating the content of the specific state, and the content information can be output in a manner permitting the recipient to perceive the content information. Thus, the recipient who is distant from the signal-transmitting watercraft 1 can know the content of the specific state of the signal-transmitting watercraft 1. The recipient having known the content of the specific state can guess the situation that the signal-transmitting watercraft 1 is in and can take appropriate actions. For example, when the calling signal contains an error code indicating the cause of the abnormal state, the recipient can readily prepare for the work of recovering the signal-transmitting watercraft 1 from the abnormal state. For example, when the information indicating the specific state includes fuel shortage, the recipient can prepare reserve fuel before heading for the signal-transmitting watercraft 1. When the information indicating the specific state includes an abnormality of a particular electric part, the recipient can prepare a necessary tool or replacement part before heading for the signal-transmitting watercraft 1. When the information indicating the specific state includes the absence of abnormalities, the recipient can head for the signal-transmitting watercraft 1 without preparing equipment needed to address the abnormal state.

The calling information can be output by the user interface of the signal-receiving watercraft 2 as a function of the calling signal received from the signal-transmitting watercraft 1. Thus, the operator of the signal-receiving watercraft 2 located around the signal-transmitting watercraft 1 can know that the signal-transmitting watercraft 1 is in the specific state and go to the rescue of the signal-transmitting watercraft 1 by using the signal-receiving watercraft 2. This can make the required travel time shorter than that in the case where an operator of a watercraft far away from the signal-transmitting watercraft 1 goes to the rescue of the signal-transmitting watercraft 1.

The calling information to be output by the user interface can contain information that helps to head for the signal-transmitting watercraft 1 (examples of the information include location, direction, and distance). Thus, the operator of the signal-receiving watercraft 2 can easily head for the signal-transmitting watercraft 1. For example, a voice or text message created by the operator of the signal-transmitting watercraft 1 could include a subjective content, which could make it difficult to understand the location information of the signal-transmitting watercraft 1. With the use of the information obtained by the positioning sensor 26, the location information of the signal-transmitting watercraft 1 can be accurately communicated to the signal-receiving watercraft 2.

The designated PWCs registered can be specified as the destinations of the calling signal. Thus, selective calling signal transmission can be achieved in which the calling signal is wirelessly transmitted only to receiving devices of a limited number of relevant people (e.g., the group members or group leader). The fact that the selective calling signal transmission is possible can improve the convenience for the operator of the signal-transmitting watercraft 1. For example, another watercraft to which the operator wants to issue a call can be specified as the destination of the signal transmission, and thus the calling appropriate for the situation of the operator can be accomplished.

The destination of the calling signal can be chosen according to a predetermined condition. Thus, the destination of the calling signal can be varied according to various factors (such as the content of the specific state, the environment, and the time zone) to achieve selective calling signal transmission.

The destination of the calling signal can be changed according to the content information indicating the content of the specific state. Thus, calling signal transmission appropriate for the content information can be achieved, and this provides improved convenience. For example, the calling can be optimized according to the significance of the specific state, and an unnecessary increase in the chance of calling signal reception can be prevented.

The calling signal can be wirelessly transmitted in response to an input manually provided by the user. Thus, generation and wireless transmission of the calling signal can be achieved by a user's operation without the need for the calling unit 20 to automatically generate the calling signal. As such, transmission of the calling signal can be accomplished at a time when the user wants to issue a call, and this provides improved convenience.

The wireless transmission of the calling signal can be performed using a wireless technology that allows a wireless signal to be delivered directly to a receiver located within a given range of communication without intervention of any base station (an example of such a technology is RF communication). Thus, the recipients of the calling signal can be limited to those who are within a given area despite the simplicity of the configuration. For example, unlike the case of two-way communication of wireless signals via a base station located on shore, the signal-transmitting watercraft 1 can transmit the calling signal to the signal-receiving watercraft 2 equipped with the receiver even when the signal-transmitting watercraft 1 is outside the range of electric wave reception of the base station.

The callback information can be output by the user interface upon reception of the callback signal as a response to the calling signal. Thus, the operator of the signal-transmitting watercraft 1 can know that the signal-receiving watercraft 2 has received the calling signal. This provides improved convenience. By knowing the reception by the signal-receiving watercraft 2, for example, the operator of the signal-transmitting watercraft 1 can take actions based on the fact of the reception. Specifically, the operator of the signal-transmitting watercraft 1 can more easily decide whether to stay or move.

After wirelessly transmitting the calling signal, the calling unit 20 of the signal-transmitting watercraft 1 can repeat the wireless transmission of the calling signal periodically until receiving the callback signal, thus encouraging the signal-receiving watercraft 2 or any other receiving entity to transmit the callback signal. This can increase the chance of calling signal reception, thus making it easier to inform another person of the presence of the signal-transmitting watercraft 1 which is in the specific state. After the calling unit 20 of the signal-transmitting watercraft 1 receives the callback signal, the frequency of retransmission of the calling signal by the signal-transmitting watercraft 1 may be reduced, or the retransmission may be ended.

The specific state indicated by the specific state signal can include the abnormal state of the PWC 1. Thus, the occurrence of an abnormality (such as operation failure or capsized state lasting for over a given period of time) of the PWC 1 can easily be communicated to another person who is capable of helping to address the abnormality. This provides improved convenience.

Although the calling system 100 has been described as including the calling unit 20 in which elements involved in the calling are accommodated in one housing, the calling system 100 is not limited to this configuration. For example, the elements involved in the calling may be located away from one another and electrically connected in a manner permitting communication between them. The first transceiver 27 and positioning sensor 26 may be mounted on the watercraft body at locations suitable for electric wave reception. The display 24 may be mounted on the watercraft body at a location that allows the operator assuming an operating position to view the display 24. The CPU 21 and memories 22 and 23 may be located in a watertight space inside the watercraft body. As described above, the elements involved in the calling can be disposed individually at suitable locations.

A part of the calling unit 20 may be installed in the PWC as standard equipment. For example, a positioning sensor installed in the PWC as standard equipment may be used as the positioning sensor 26. Likewise, an instrument panel installed in the PWC as standard equipment may be used as the display 24. The number of components additionally used in the PWC to construct the calling system 100 can be reduced by embodying the calling system 100 using components installed in the PWC as standard equipment.

The calling unit 20 may be an accessory removably mounted on the PWC. This allows for easy repair or replacement of the calling unit 20 in the event of failure. With the calling unit 20 being a removably mounted accessory, the structure of the watercraft body can be the same for the case where the calling system 100 is unnecessary and the case where the calling system 100 is used.

Although in the present embodiment the calling signal can contain not only the information indicating the specific state but also other pieces of information such as the location information, the calling signal may contain only the information indicating the specific state. The destination of the calling signal need not be selected, and the calling signal may be transmitted to all of communication partners with which the PWC can establish two-way communication. The specific state described above is merely an example, and the specific state may include another state in regard to which transmission of the calling signal is preferred. For example, the calling signal may be transmitted to request other watercrafts to come to the location of the PWC or a designated location. The calling signal may be intended to deliver some kind of information to the other watercrafts.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the present disclosure, the circuitry, units, or means are hardware that carry out or are programmed to perform the recited functionality. The hardware may be any hardware disclosed herein or otherwise known hardware which is programmed or configured to carry out the recited functionality. When the hardware is a processor which may be considered a type of circuitry, the circuitry, means, or units are a combination of hardware and software, the software being used to configure the hardware and/or processor.

The above embodiment has been described to illustrate the technology disclosed in the present application. The technology of the present disclosure is not limited to the above embodiment, and is applicable also to embodiments obtained by making appropriate modifications, replacements, additions, and/or omissions to the above embodiment. The elements described in the above embodiment may be combined to form other embodiments. For example, one or more elements or a method in one embodiment may be used in another embodiment. One or more elements in an embodiment may be arbitrarily extracted separately from the other elements in the embodiment. For the purpose of illustrating the technology, the elements disclosed in the attached drawings and the detailed description include not only elements essential for problem solution but also elements inessential for problem solution.

What is claimed is:

1. A calling system mounted on a first personal watercraft, comprising:
    a display that displays a map screen; and
    processing circuitry configured to:
        wirelessly receive a calling signal from a second personal watercraft being in a trouble state or an abnormal state, the calling signal containing location information indicating a location of the second personal watercraft; and
        cause the map screen to display a mark indicating the location of the second personal watercraft based on the calling signal,
    wherein the processing circuitry is further configured to cause the map screen to display an arrow indicating a direction of the location of the second personal watercraft with respect to a location of the first personal watercraft when the second personal watercraft is outside a display range of the map screen.

2. The calling system according to claim 1, wherein the processing circuitry is further configured to:
    cause the map screen to display a mark indicating a location of a third personal watercraft; and
    cause the map screen to display the mark indicating the location of the second personal watercraft in a different manner from the mark indicating the location of the third personal watercraft.

3. The calling system according to claim 2, wherein the different manner includes blinking, color change, enlargement, or brightness change.

4. The calling system according to claim 1, wherein the processing circuitry is further configured to cause the display to display a distance from the first personal watercraft to the second personal watercraft.

5. The calling system according to claim 1, wherein the processing circuitry is further configured to cause the display to display identification information of the second personal watercraft.

6. The calling system according to claim 1, wherein the processing circuitry is further configured to cause the display to display information indicating a state of the second personal watercraft.

7. The calling system according to claim 6, wherein the information indicating the state of the second personal watercraft includes a content indicating that the second personal watercraft is incapable of traveling.

8. The calling system according to claim 7, wherein the content indicating that the second personal watercraft is incapable of traveling includes (i) capsizing of the second personal watercraft, (ii) failure of a prime mover of the second personal watercraft, (iii) running out of fuel for the second personal watercraft, or (iv) running out of a battery for the second personal watercraft.

9. The calling system according to claim 1, further comprising a user input interface,
wherein the processing circuitry is further configured to:
receive a callback command from the user input interface after receiving the calling signal; and
wirelessly transmit a callback signal to the second personal watercraft in response to the callback command.

10. A calling system mounted on a first personal watercraft, comprising:
a display; and
processing circuitry configured to:
wirelessly receive a calling signal from a second personal watercraft being in a trouble state or an abnormal state, the calling signal including information that helps to head for the second personal watercraft; and
cause the display to display a mark indicating a location of the second personal watercraft based on the calling signal,
cause the display to display information indicating content information contained by the calling signal,
wherein the content information indicates a content of a state of the second personal watercraft, and the content is one selected from multiple types of states.

11. The system according to claim 10, wherein the content indicates that the second personal watercraft is incapable of traveling.

12. The system according to claim 10, wherein the content indicating that the second personal watercraft is incapable of traveling includes (i) capsizing of the second personal watercraft, (ii) failure of a prime mover of the second personal watercraft, (iii) running out of fuel for the second personal watercraft, or (iv) running out of a battery for the second personal watercraft.

13. The system according to claim 10, wherein the processing circuitry is further configured to:
cause the display to display a mark indicating a location of a third personal watercraft; and
cause the display to display the mark indicating the location of the second personal watercraft in a different manner from the mark indicating the location of the third personal watercraft.

14. The system according to claim 10, wherein the processing circuitry is further configured to cause the display to display a distance from the first personal watercraft to the second personal watercraft.

15. A system comprising:
a first personal watercraft comprising a first display and first processing circuitry; and
a second personal watercraft comprising a second display and second processing circuitry, wherein
the first processing circuitry is configured to wirelessly transmit a calling signal;
the second processing circuitry is configured to:
wirelessly receive the calling signal from the first personal watercraft being in a trouble state or an abnormal state, the calling signal including information that helps to head for the second personal watercraft; and
cause the display to display a mark indicating a location of the second personal watercraft based on the calling signal,
wherein the second personal watercraft further comprising a user input interface,
wherein the second processing circuitry is further configured to:
receive a callback command from the user input interface after receiving the calling signal; and
wirelessly transmit a callback signal to the first personal watercraft in response to the callback command, and
wherein the first processing circuitry is further configured to:
receive the callback signal; and
inform a driver of the first personal watercraft of callback information in response to the callback signal.

16. The system according to claim 15, wherein the first processing circuitry is further configured to choose one or more destinations of the calling signal according to a predetermined condition.

17. The system according to claim 15, wherein the first personal watercraft further comprising a first user input interface, wherein
transmitting the calling signal includes transmitting the calling signal upon determining that a calling request has been input through the first user input interface.

18. The calling system according to claim 1, wherein the processing circuitry is further configured to cause the display to display information indicating content information contained by the calling signal,
wherein the content information indicates a content of a state of the second personal watercraft.

19. The calling system according to claim 18, wherein the content indicates that the second personal watercraft is incapable of traveling.

* * * * *